United States Patent [19]

Latsch

[11] 4,391,248
[45] Jul. 5, 1983

[54] METHOD FOR CLOSED-LOOP CONTROL OF THE IGNITION ANGLE OR THE COMPOSITION OF THE OPERATIONAL MIXTURE FURNISHED AN INTERNAL COMBUSTION ENGINE

[75] Inventor: Reinhard Latsch, Vaihingen, Fed. Rep. of Germany

[73] Assignee: Robert Bosch GmbH, Stuttgart, Fed. Rep. of Germany

[21] Appl. No.: 191,743

[22] Filed: Sep. 29, 1980

[30] Foreign Application Priority Data

Sep. 29, 1979 [DE] Fed. Rep. of Germany ....... 2939590

[51] Int. Cl.³ .......................... F02D 33/00; F02P 5/10
[52] U.S. Cl. ..................................... 123/425; 123/435
[58] Field of Search .......................... 123/435, 425, 415

[56] References Cited

U.S. PATENT DOCUMENTS 3,957,023  5/1976  Peterson ...................... 123/146.5 A
4,063,538  12/1977  Powell et al. ....................... 123/425
4,190,027  2/1980  Inui et al. .............................. 123/425
4,216,750  8/1980  Kobayashi .......................... 123/435

FOREIGN PATENT DOCUMENTS 1512213  5/1978  United Kingdom ................ 123/435

Primary Examiner—Charles J. Myhre
Assistant Examiner—Andrew M. Dolinar
Attorney, Agent, or Firm—Edwin E. Greigg

[57] ABSTRACT

A method is proposed for the closed-loop control of the composition of the operational mixture furnished an internal combustion engine, in which the location of the peak combustion chamber pressure is ascertained relative to top dead center during sequential work cycles and a control signal is formed from the fluctuations in the occurrance of the peak combustion chamber pressure from top dead center, by means of which control signal a permissible extent of fluctuation is established by means of influencing components of the operational mixture or the ignition angle.

6 Claims, 4 Drawing Figures

METHOD FOR CLOSED-LOOP CONTROL OF THE IGNITION ANGLE OR THE COMPOSITION OF THE OPERATIONAL MIXTURE FURNISHED AN INTERNAL COMBUSTION ENGINE

CROSS REFERENCE TO RELATED APPLICATIONS

This application discloses subject matter in common with applications, Ser. No. 191,742 and Ser. No. 191,749. The inventions disclosed in these three applications are commonly assigned.

BACKGROUND OF THE INVENTION

In internal combustion engines functioning with externally supplied ignition, it is known to control the instant of ignition in a closed-loop fasion in accordance with the occurrence of the peak pressure relative to the occurrence of top dead center during the combustion process. An optimal set-point value representative of the angular crankshaft position at which the peak pressure is supposed to occur in the combustion chamber is gnerated, and the instant of ignition is appropriately corrected when there is a deviation from this set-point value (See Powell, "Closed Loop Control of Spark Timing", Automobile Engine Control Symposium, April 1976).

It is also known, from German Offenlegungsschrift (laid-open application) No. 24 49 836, to control the composition of the operational mixture in a closed-loop fashion in terms of the fuel, air, or exhaust gas component in accordance with the fluctuations of the combustion chamber pressure at predetermined crankshaft angles in sequential work cycles. According to the teaching of this German application, the engine roughness is evaluated as a control variable in the region of the lean running limit of the engine, where, because of the irregularity of ignition, more or less severe fluctuations in the attainable combustion chamber pressure occur. In the described method, a representative signal of the combustion chamber pressure is integrated over the work cycle and an interrogation is performed at predetermined angles of the crankshaft rotation. The degree of fluctuations serves as a standard for the approach to the lean running limit, while a predetermined set-point value represents the threshold values for the closeness of permissible approach to the lean running limit. Because a substantial increase in the average combustion chamber pressures first occurs at relatively severe leaning, this method is usable only in the case of an operational mixture which is to be severely leaned down.

OBJECT, SUMMARY AND ADVANTAGES OF THE INVENTION

It is an object of the present invention to provide a method for closed-loop control of ignition angle or the composition of the operational mixture furnished to an internal combustion engine according to which the peak combustion chamber pressure is detected and utilized to control ignition angle or the proportion of one of the operational components of the operational mixture.

The invention teaches ascertaining the occurrence of the peak combustion chamber pressure relative to the occurrence of the top dead center in sequential work cycles in a combustion chamber, and utilizing this information to generate a control signal as a function of the difference between the occurrence of the peak combustion chamber pressure and the occurrence of top dead center in the sequential work cycles in terms of time of occurrence or crankshaft angular displacement in each sequential work cycle. The control variable is compared to a set-point value and a difference signal generated which controls ignition angle or the proportion of at least one component of the operational mixture.

The method according to the invention has the advantage that the location of the maximum value for the combustion chamber pressure attained per work cycle is ascertained. In this manner, rapid and precise information is obtained as to the flammability or ignitability of the operational mixture furnished. The occurrence of the peak combustion chamber pressure reacts substantially more sensitively to changes in the operational mixture composition, so that evaluatable control signals are attainable here in air number ($\lambda$) ranges for the operational mixture close to $\lambda=1$. The fluctuations in the occurrence of the peak combustion chamber pressure increase progressively with an increasing air number, an increasing exhaust gas recirculation rate, or with an ignition angle shifted toward "late". When the pressure signal is used for other control purposes (for instance, for the closed-loop control of the knocking limit when the ignition angle is shifted), it is possible to omit one transducer for engine roughness.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
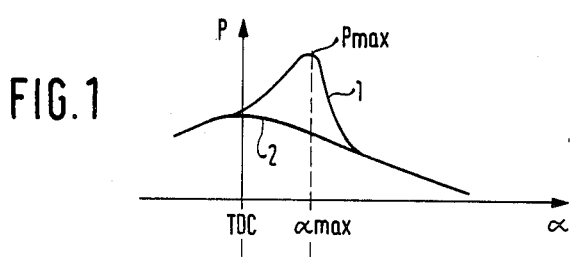
FIG. 1 is a diagram showing the profile of the peak pressure over the crankshaft angle $\alpha$.
Figure 2:
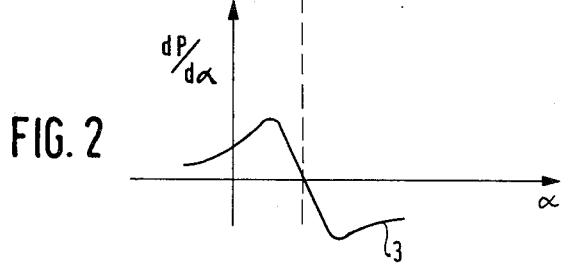
FIG. 2 shows the profile of the first derivative of the peak pressure in accordance with the crankshaft angle $\alpha$.

Curve 1 of FIG. 1 shows how the combustion chamber pressure varies after ignition over a crankshaft angle range after top dead center of $0° < \alpha < 90°$. A maximum pressure occurs after the occurrence of top dead center. The maximum pressure can have a higher value or lower value depending upon the mixture composition. Curve 2 shows how the combustion chamber pressure increases as a result of the compression of the stroke volume. Curve 3 given in FIG. 2 shows the first derivative of the combustion chamber pressure over the crankshaft angle $\alpha$. When the combustion chamber pressure attains the maximum of $P_{max}$, curve 3 passes through zero, which thus represents a clear standard for the associated angle $\alpha_{max}$ at which the peak combustion chamber pressure occurs. In accordance with the invention, the variation of $\alpha_{max}$ is detected for the purpose of further evaluation; however, it may also be detected as a time value. In this case, though, a means of rpm compensation must be porvided.

Figure 3:
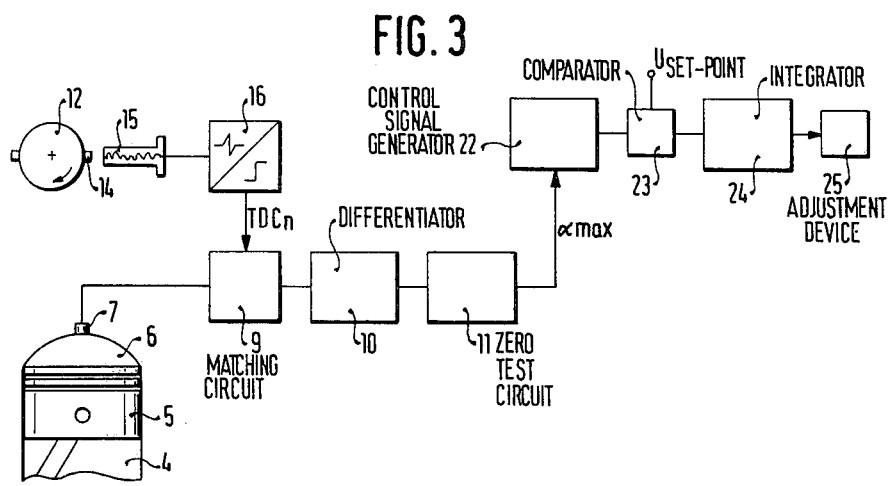
FIG. 3 is a block circuit diagram for the evaluation of the peak pressure for purposes of closed-loop control of the operational mixture composition.

FIG. 3 is a schematic representation of the evaluation circuit for evaluating the variable occurrence of the peak combustion chamber pressure relative to the occurrence of top dead center. A cylinder 4 of an engine is shown in which a piston 5 reciprocates. The piston 5 partly defines one main combustion chamber 6 in the cylinder 4. A pressure sensor 7 is provided in the combustion chamber wall, preferably emitting a control voltage corresponding to the pressure in the chamber 6. This control voltage is fed to a circuit element 9 where the profile of the control voltage is matched to or made to relate to the crankshaft angle $\alpha$. A circuit element 10 is provided in which the first derivative $dp/d\alpha$ is generated from the signal $p(\alpha)$ generated as the output of the circuit 9. In a circuit element 11, the profile of the first derivative $dp/d\alpha$ is tested for zero occurrences, and upon the first zero occurrence, the associated crankshaft angle $\alpha_{max}$ is ascertained.

In order to maintain the relationship of the control voltage (pressure signal) to the crankshaft angle $\alpha$, as noted above, a signal (switching signal) is generated upon the passage of the crankshaft through top dead center and delivered to circuit element 9. The crankshaft 12 of the engine has signal markings 14, whose passage through top dead center are ascertained, for instance with an inductive transducer 15. A pulse shaper circuit 16, is connected to the inductive transducer 15. The pulse shaper circuit 16 receives the output pulses from the transducer 15 and generates the switching signal. With this signal, a timing or angular measurement device, preferably the circuit element 10, can be started, which is interrogated by the circuit element 11 for monitoring the instant of the appearance of the zero passage of the first derivative of the pressure signal. The corresponding angular value is then delivered as an actual value signal $\alpha_{max}$ to a circuit element 22, which generates a control signal $\Delta\alpha$ control. This signal is generated from the sequential values of $\alpha_{max}$, i.e., $\Delta\alpha$ control $= \alpha_{max_i} - \alpha_{max_{i-1}}$, which, as an average value, corresponds to the roughness of the engine. This signal is compared in a comparator device 23 with a set-point value for $\Delta\alpha$ control, and a difference signal resulting from this comparison is delivered to an integrator 24, whose output signal controls either a fuelair adjustment device 25, an ignition angle adjustment device, or an exhaust gas recirculation control device.

The circuit element 22 for evaluating the sequential values of $\alpha_{max}$ is known, for instance from U.S. Pat. Nos. 4,153,013, 4,044,236 or 4,161,162.

Figure 4:
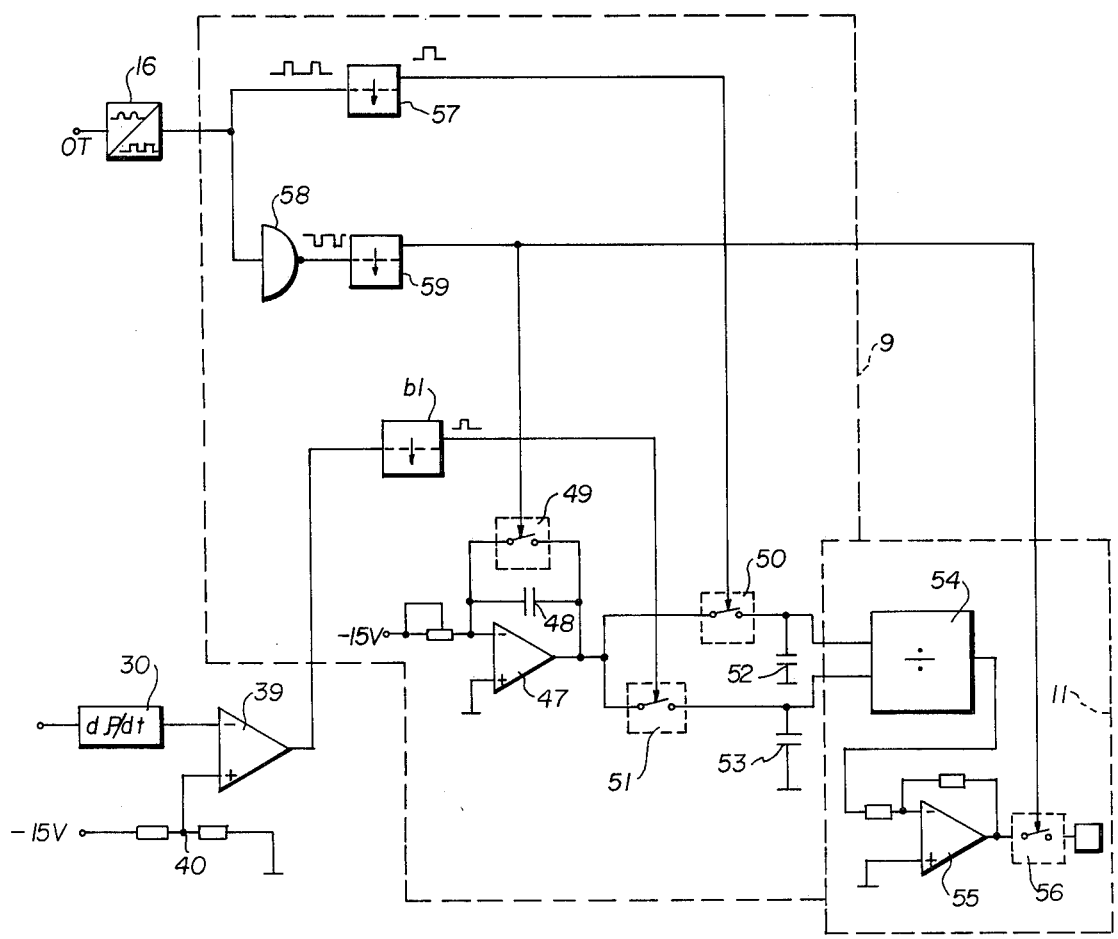
FIG. 4 is a detailed circuit diagram of a portion of the circuit in FIG. 3.

One exemplary embodiment of the signal evaluation shown schematically in FIG. 3 is illustrated in FIG. 4. FIG. 4 shows the circuit portion 10 for determining $du/d\alpha$ in greater detail. It must be presumed that for ascertaining the maximum values of $\alpha$ it is insignificant whether derivation is performed according to time or according to the angle. In an advantageous embodiment, the derivation is therefore performed according to time.

To this end, a first differentiator 30 is provided in the circuit portion 10 and differentiates the output voltage of the pressure sensor. The output of the differentiator 30 is connected with the inverting input of a first operational amplifier 39, the reference input of which is placed at 0 volts using a voltage divider 40.

Thus, from the voltage signal arriving from the pressure sensor, the first derivation is formed according to time, using the differentiator 30, and the derived control variable is first monitored as to the plus-to-minus passages by the first operational amplifier. At the output, a steep voltage increase then occurs based on the thresholdvalue characteristic; this increase is emitted to one input of multivibrator 61, which is a component of a circuit 9 by means of which the derived values of the ion current signal are related to the angle of rotation $\alpha$.

The essential component of this circuit portion is an integrator, comprising a second operational amplifier 47, the output of which is connected via a capacitor 48 with its inverting input. A bypass is connected parallel to the capacitor and a first switch 49 is disposed in this bypass. At the output of the operational amplifier 47, a second switch 50 and a third switch 51 are disposed parallel to one another. The output of the two switches is connected via respective capacitors 52 and 53 to ground. The output of the second switch 50 is furthermore connected with one input of a divider circuit 54, and the output of the third switch 50 is connected with the other input of the divider circuit 54. The output of the divider circuit leads via a third operational amplifier 55 to a fourth switch 56.

In FIG. 4, the pulse shaper circuit 16 is also shown, at the output of which square pulses with an rpm-dependent frequency appear, controlled by a crankshaft marking. The output of the circuit 16 is connected both with a first mono-stable multivibrator 57 and, via a reversing gate 58, with a second monostable multivibrator 59. The first monostable multivibrator 57 switches over in response to a leading edge of each pulse emitted by the pulse shaping circuit 16 and at its Q output generates a pulse from the state time of the multivibrator. The second multivibrator 59 also reacts to the rise of an edge, but since the pulse train of the pulse shaping circuit 16 was inverted by the reversing circuit, a given pulse at the output of the multivibrator indicates the trailing edge of each pulse emitted by the shaping circuit 16.

The pulses emitted by the second multivibrator 59 control the first switch 49. The integrator 47, 48 is thus set by means of the brief closure of the switch 49. The output signal then increases linearly until the integrator is set once again by another closure of the first switch 49. The output of the first multivibrator 57, in contrast, controls the second switch 50, so that a maximum voltage value of the integrator output, corresponding for instance to a 180° angle of revolution, is stored in the capacitor 52 shortly before the integrator is set. The third switch 51 is controlled by a third monostable multivibrator 61, the input of which is connected with the output of the first operational amplifier 39, by the output of which the multivibrator 61 is set. With the setting of the multivibrator, the third switch 51 is closed, and the instantaneous integration value of the integrator 47, 48 is taken over into the capacitor 53.

The above-described embodiment should be considered an example for the realization of the concept according to the invention. Naturally, it is also possible, in place of the analog evaluation shown here, to use a computer which operates in digital fashion.

What is claimed and desired to be secured from Letters Patent of the United States is:

1. A method of closed-loop control for the composition of an operational mixture furnished to an internal combustion engine for combustion therein, comprising the steps of:
   ascertaining the occurrence of the top dead center in sequential work cycles of at least one combustion chamber of the engine;
   measuring the magnitude of the combustion chamber pressure of said at least one combusting chamber with a pressure probe;

ascertaining the occurrence of the peak combustion chamber pressure from the measured magnitude of the combustion chamber pressure, relative to the ascertained top dead center occurrence in sequential work cycles of said at least one combustion chamber;

generating a control signal as a function of the difference between two successive occurrences of the peak combustion chamber pressure relative to the occurrence of the top dead center in sequential work cycles of said at least one combustion chamber;

generating a set-point value for the control signal;

comparing the generated control signal to the generated set-point value and generating a difference signal; and adjusting the proportion of at least one component of the operational mixture in accordance with the generated difference signal.

2. The method as defined in claim 1, wherein the top dead center in the sequential work cycles of said at least one combustion chamber is ascertained by monitoring engine crankshaft rotation, wherein the measured magnitude of the combustion chamber pressure is matched with the monitored engine crankshaft rotation in sequential work cycles of said at least one combustion chamber, and wherein the control signal represents the difference in crankshaft angle between top dead center and the peak pressure occurrence.

3. The method as defined in claim 2, wherein the occurrence of the peak combusting chamber pressure is ascertained by differentiating the output of the pressure probe.

4. A method of closed-loop control of the ignition angle of an internal combustion engine comprising the steps of:

ascertaining the occurrence of the top dead center in sequential work cycles of at least one combustion chamber of the engine;

measuring the magnitude of the combustion chamber pressure of said at least one combustion chamber with a pressure probe;

ascertaining the occurrence of the peak combustion chamber pressure from the measured magnitude of the combustion chamber pressure, relative to the ascertained top dead center occurrence in sequential work cycles of said at least one combustion chamber;

generating a control signal as a function of the difference between two successive occurrences of the peak combustion chamber pressure relative to the occurrence of the top dead center in sequential work cycles of said at least one combustion chamber;

generating a set-point value for the control signal;

comparing the generated control signal to the generated set-point value and generating a difference signal; and adjusting the ignition angle in accordance with the generated difference signal.

5. The method as defined in claim 4, wherein the top dead center in the sequential work cycles of said at least one combustion chamber is ascertained by monitoring engine crankshaft rotation, wherein the measured magnitude of the combustion chamber pressure is matched with the monitored engine crankshaft rotation in sequential work cycles of said at least one combustion chamber, and wherein the control signal represents the difference in crankshaft angle between top dead center and the peak pressure occurrence.

6. The method as defined in claim 4, wherein the occurrence of the peak combusting chamber pressure is ascertained by differentiating the output of the pressure probe.

* * * * *